United States Patent [19]

Giannarelli et al.

[11] 4,061,462

[45] Dec. 6, 1977

[54] APPARATUS FOR EXTRUDING THERMOPLASTIC MATERIAL

[75] Inventors: Giancarlo Giannarelli, Milan; Walter Movilli, Bollate (Milan), both of Italy

[73] Assignee: Montedison S.p.A., Milan, Italy

[21] Appl. No.: 586,910

[22] Filed: June 16, 1975

[30] Foreign Application Priority Data

June 17, 1974 Italy .................................. 24029/74

[51] Int. Cl.² ............................................. B29F 3/00
[52] U.S. Cl. ............................... 425/464; 425/378 R; 425/382 R
[58] Field of Search ................... 425/199, 376, 378 R, 425/382 R, 461, 462, 467, 464, 380, 197, 198

[56] References Cited

U.S. PATENT DOCUMENTS

| 2,291,212 | 7/1942 | Clinefelter | 425/199 |
| 2,766,479 | 10/1956 | Henning | 425/199 X |
| 2,792,122 | 5/1957 | Munch et al. | 425/199 X |
| 2,821,745 | 2/1958 | Patton | 425/199 |
| 3,601,846 | 8/1971 | Hudnall | 425/199 X |

*Primary Examiner*—Richard B. Lazarus
*Attorney, Agent, or Firm*—Morgan, Finnegan, Pine, Foley & Lee

[57] ABSTRACT

This invention relates to a process for extruding particular shapes in thermoplastic material and, more precisely, flat plates, corrugated plates and the like or, in general, shapes having one section much larger than the other; said process being suited to eliminate the uneven feed of the molten material coming out from a die. This invention relates also to an improved extrusion machine which is particularly useful for carrying out the aforementioned process.

3 Claims, 3 Drawing Figures

APPARATUS FOR EXTRUDING THERMOPLASTIC MATERIAL

BACKGROUND OF THE INVENTION

As is known, one of the difficulties connected with the extrusion of shapes in thermoplastic material is the regulation of the thrusts in the various points of the die outlet section. Such problem is particularly complicated in the case of plates or, in general, of sections whose one dimension is much greater than the other.

In fact, the longer distance to be covered by the material in order to reach the section ends causes a greater pressure drop and, by consequence, a thrust decrease. This causes different feed speeds of the molten product which, in the case of extrusion of plates, assume very high values.

The aforesaid drawback is generally obviated by having recourse to various contrivances, depending upon the type of shape. In the case of plates extrusion the art suggests, for example, to regulate the thrusts by using a bending bar, located transversally to the head and controlled by a set of adjusting screws, which permits a throttling of the flow section in the points where the molten product flow speed is the higher. By operating in this way and after a suitable adjustment, a regular feed of the plate is achieved.

The above described method, unfortunately, presents several drawback, that may be summarized as follows:

1. Both design and construction of the head are particularly expensive and laborious.
2. Since the bar is subjected to continuous bendings, after a certain time-period it becomes unusable and must be replaced. Moreover, the regulation so attained is rather low.
3. The adjustment operation necessary to attain a regular feed of the plate is often time consuming and complicated resulting in a waste of time and material.
4. The utilization of the bar, although it regulates the thrusts, does not solve the problem connnected with the different run and consequently, the different residence time of the material in the various head zones. This is very detrimental to the proceeding of easily degradable materials (PVC), or — in general — of materials, during whose conversion, the amount of heat yielded to the material and the transmission speed of said heat are of particular importance, such as lightened or cellular plastics recently or presently developed.

It is an object of this invention to provide an improved method and apparatus for extruding products into shapes having sections whose one dimension is much larger than the other.

It is also an object of this invention to provide an improved extrusion apparatus for regulating the thrust and flow of speed of molten materials which is simple in design and construction.

It is a further object to provide a method and apparatus for regulating the flow of molten material to provide equal residence time for all material in the extrusion head and providing material of equal temperature and viscosity in all sections of the parts to be extruded. Another object of the present invention is to provide an improved extrusion process and apparatus particularly suited to both flat and corrugated plates or, in general, to shapes having one section much greater than the other.

Finally, it is an object to provide an improved apparatus for controlling the material to be extruded into shapes having a section with one dimension much larger than the other dimension which is readily adapted for use with conventional equipment.

SUMMARY OF THE INVENTION

These and still other objects, that will more clearly appear from the detailed description given hereinafter, are best attained in practice by means of an improved process in accordance with this invention for extruding thermoplastic materials in the form of large-size shapes, in particular of plates and the like. The process, according to this invention, includes the steps of subdividing the molten material flowing from an extrusion head among a number of flow tubes separated from one another, the tubes having preferably equal cross-sections; said flow tubes passing through a thermoregulated bath and leading to the various zones of the die section, from which a shape in the form of a plate or the like is extruded; getting such flow tubes to cover distances substantially of the same length or, in any case, providing tubes such as to cause the same pressure drop in each tube, in order to have the material flow out of the tubes at the same temperature and at the same speed all over the shape section.

With a view to practicing said extrusion process, a machine has been designed, that consists - according to this invention - of a conventional extrusion head of the type having the molten material outlet zone in the form of a circular crown, with which one end of a set of metal tubes, having preferably the same lengths and the same diameters, is tight-connected, and the opposite ends of such tubes having their centers gathered on a same line and connected with a die (or extrusion device) for flat plates or the like. The set of tubes are passed through a thermoregulated bath or the like, interposed between said extrusion head and the die.

The present invention is now described in more detail with reference to a preferred and non-exclusive embodiment, as well as to the attached drawings, which are illustrative of a preferred embodiment.

DETAILED DESCRIPTION OF A PREFERRED EMBODIMENT

Figure 3:
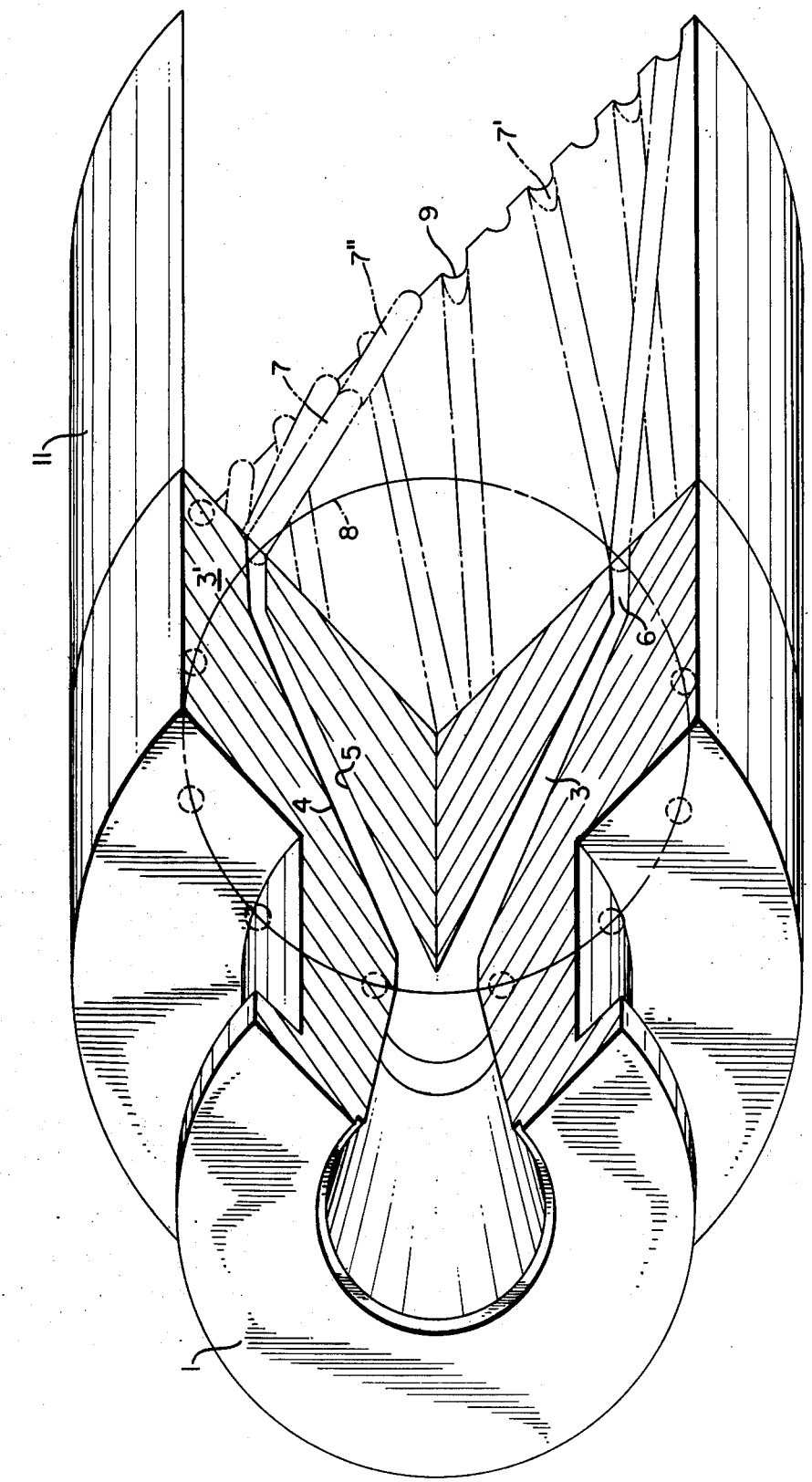
FIG. 3 is an enlarged, perspective view, partially in cross-section, of the apparatus in FIG. 1.

With reference to the drawings, the apparatus for carrying out the aforesaid process utilizes a conventional extruder (not appearing in the figures), equipped with extrusion head 1 of the known type. The material reaches head 1 by flowing through truncated cone-shaped union 2 (FIGS. 1 and 3) and into a hollow screw zone 3, also having the form of a truncated cone, defined by an outer tapered surface 4 and the inner surface 5. Truncated cone-shaped hollow zone 3 is connected with circular crown 6.

Figure 1:
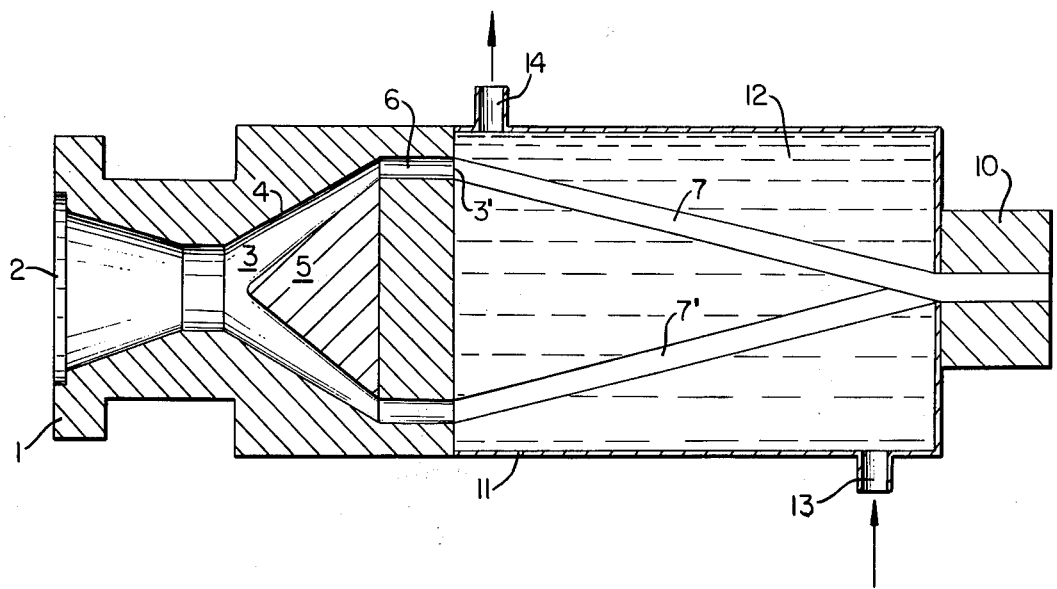
FIG. 1 is schematic, longitudinal section view of an improved extrusion apparatus in accordance with the present invention.
Figure 2:
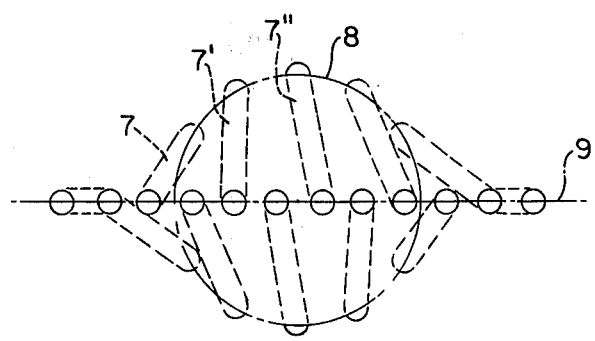
FIG. 2 is a schematic view illustrating the arrangement of the set of tubes, as viewed from the die end of the apparatus towards the circular crown of the head.

A plurality of metal tubes 7,7',7" etc. are connected in fluid tight communication with zone 3, which has the shape of a truncated cone, and, more precisely, the tubes are connected with circular sector 3' to receive the material outflow. Metal tubes 7,7',7" etc. are equispaced from one another and, therefore, their ends are distributed on a circle sector (for example, as indicated with numeral 8 in FIGS. 2 and 3), that corresponds to the center line circle of circular sector 3'. All the tubes have the same length and the same inside and outside diameters. The tubes are arranged in such a way, that the centers of their opposite ends are gathered on a line 9 (FIGS. 2 and 3), corresponding to the median longitudinal axis of a flat die 10 (FIG. 1). The ends of the gathered tubes are in fluid tight-connection with the hollow zone of die 10.

The various spaces existing among the closer-brought tube ends, both those connected with circular crown 3 and those connected with die 10, are closed or clogged, since the molten material coming from circular crown 3 is conveyed into the tube bundle, where it is made to subdivide among several flow tubes until it comes out, in the form of a continuous plate, from die 10.

Furthermore, the tube bundle is immerged in a thermoregulated bath consisting of a chamber 11, into which oil or other fluid 12, at a pre-fixed temperature, is introduced through inlet 13 and recovered through outlet 14.

It has been ascertained in practice that by subdividing the molten material flowing from the extrusion head among a number of flow tubes having the same section, through tubes of the same length and diameter, it is possible to accurately control the temperatures and to have available a material outflowing at the same temperature and speed from all points of the shape section. When extruding non-flat plates, the use of tubes which are equal sections and lengths, and practically rectilinear, like those illustrated in the Figures, may sometimes fail to cause the same pressure drops, and, as a consequence, fail to ensure the desired results. In such cases, in order to obtain like pressure drops and therefore like thrusts in all tubes, the tubes may have different sections and lengths, for example truncated cone-shaped tubes of different lengths and/or of diameters different from one another. These particular embodiments also fall within the scope and spirit of the inventive idea of the present invention, since they always practice the process described hereinbefore.

Of course, other constructive and technically equivalent modifications may be made to the embodiments described, without departing from the scope and spirit of the present invention, as pointed out in the appended claims.

We claim:

1. An extrusion machine for producing plates of thermoplastic material, said machine having an extrusion head with a molten material outlet zone shaped as a circular crown and a die member for plates; a set of separated tubes, one end of each tube being in fluid tight communication with said outlet zone of said circular crown and the opposite ends of the tubes being gathered on a same median line and in fluid tight communication with the die member, whereby molten material is transferred from said outlet zone to said die member in said tubes, the length and interior cross-section of the tubes being such that a constant pressure drop in molten material is produced in each tube, said set of tubes being immerged in a thermoregulated bath interposed between said extrusion head and said die member.

2. The machine according to claim 1, wherein each of said tubes have the same length and interior cross-section.

3. The machine according to claim 1, wherein said tubes are rectilinear and have a constant cross-section.

* * * * *